US012360882B2

(12) United States Patent
Bakshi et al.

(10) Patent No.: US 12,360,882 B2
(45) Date of Patent: Jul. 15, 2025

(54) CREATING AN OPTIMAL TEST SUITE

(71) Applicant: Webomates Inc., Stamford, CT (US)

(72) Inventors: Aseem Bakshi, Stamford, CT (US); Mark Sawers, Stamford, CT (US); Ruchika Gupta, Stamford, CT (US)

(73) Assignee: Webomates Inc., Stamford, CT (US)

( * ) Notice: Subject to any disclaimer, the term of this patent is extended or adjusted under 35 U.S.C. 154(b) by 0 days.

(21) Appl. No.: 18/225,350

(22) Filed: Jul. 24, 2023

(65) Prior Publication Data

US 2025/0036554 A1    Jan. 30, 2025

(51) Int. Cl.
*G06F 11/3668* (2025.01)

(52) U.S. Cl.
CPC ...... *G06F 11/3676* (2013.01); *G06F 11/3684* (2013.01)

(58) Field of Classification Search
CPC ............. G06F 11/3676; G06F 11/3684; G06F 11/36–3696
See application file for complete search history.

(56) References Cited

U.S. PATENT DOCUMENTS

| | | | | |
|---|---|---|---|---|
| 9,208,062 | B1 * | 12/2015 | Arguelles | G06F 11/3692 |
| 9,569,179 | B1 * | 2/2017 | Kachmar | G06F 8/30 |
| 2011/0047531 | A1 * | 2/2011 | Wang | G06F 11/3676 |
| | | | | 717/130 |
| 2013/0111267 | A1 * | 5/2013 | Beryoza | G06F 11/3688 |
| | | | | 714/E11.178 |
| 2015/0220420 | A1 * | 8/2015 | Boneti | G06F 11/3419 |
| | | | | 714/37 |
| 2019/0196952 | A1 * | 6/2019 | Manchiraju | G06F 11/3676 |
| 2019/0243752 | A1 * | 8/2019 | Bakshi | G06F 11/3688 |
| 2020/0151089 | A1 * | 5/2020 | Bakshi | G06F 11/3696 |

(Continued)

FOREIGN PATENT DOCUMENTS

| | | |
|---|---|---|
| CN | 110737574 A | 1/2020 |
| CN | 114297071 A | 4/2022 |

(Continued)

OTHER PUBLICATIONS

Abdallah, Samar Ali, Ramadan Moawad, and Esaam Eldeen Fawzy. "An optimization approach for automated unit test generation tools using multi-objective evolutionary algorithms." Future Computing and Informatics Journal 3.2 (2018): 178-190. (Year: 2018).*

(Continued)

*Primary Examiner* — Bradley A Teets
*Assistant Examiner* — Joanne G Macasiano
(74) *Attorney, Agent, or Firm* — Jason A. Smith; Shumaker, Loop & Kendrick, LLP

(57) ABSTRACT

A system and a method for creating an optimal test suite. The system may receive code coverage data from a set of testing channels. Further, a combined dataset is created by merging the code coverage data received from the set of testing channels. The combined dataset is analyzed to identify a line of code being executed by two or more test cases corresponding to two or more testing channels of the set of testing channels. Further, at least one test case from the two or more test cases having less efficiency is eliminated to create an optimal test suite. The efficiency is determined based on at least one of execution time, execution cost, and resources required to execute the line of code.

15 Claims, 3 Drawing Sheets

(56) References Cited

U.S. PATENT DOCUMENTS

| | | | | |
|---|---|---|---|---|
| 2021/0056007 A1* | 2/2021 | Viswanathan | ...... | G06F 11/3688 |
| 2021/0149793 A1* | 5/2021 | Shao | ................ | G06F 11/3688 |
| 2022/0206927 A1* | 6/2022 | Bakshi | ............. | G06Q 30/0631 |
| 2023/0059703 A1* | 2/2023 | Huang | ............... | G06F 11/3684 |

FOREIGN PATENT DOCUMENTS

| | | |
|---|---|---|
| CN | 114416584 A | 4/2022 |
| CN | 109388566 B | 7/2022 |

OTHER PUBLICATIONS

Song, Chen, and Jiecong Yang. "Software Testing Resource Scheduling based on Artificial Intelligence." (2022). (Year: 2022).*

Burr, Kevin, and William Young. "Combinatorial test techniques: Table-based automation, test generation and code coverage." Proc. of the Intl. Conf. on Software Testing Analysis & Review. 1998. (Year: 1998).*

Guo, Shikai, Rong Chen, and Hui Li. "A real-time collaborative testing approach for web application: Via multi-tasks matching." 2016 IEEE International Conference on Software Quality, Reliability and Security Companion (QRS-C). IEEE, 2016. (Year: 2016).*

* cited by examiner

CREATING AN OPTIMAL TEST SUITE

PRIORITY INFORMATION

The present application does not claim priority from any other application.

TECHNICAL FIELD

The present subject matter described herein, in general, relates to determining code coverage of a software using a set of testing channels and, more particularly, to a system and a method for creating an optimal test suite.

BACKGROUND

Software development and testing processes are crucial for ensuring the reliability, functionality, and quality of software applications. Among the various techniques employed by developers and testers, code coverage analysis stands out as an important practice. It measures the extent to which a source code of a software application has been executed during testing, providing valuable insights into the thoroughness of the testing process. However, traditional code coverage analysis methods have relied heavily on manual inspection or limited automated tools, leading to inefficiencies and inaccuracies. These conventional approaches often struggle to address the complexities and challenges posed by modern software systems, particularly large-scale applications with intricate code structures.

To ensure the functional quality of software, developers employ a combination of testing channels that align with the specific needs of a project. The evaluation of testing strategies and their implementation, including code coverage analysis, plays a crucial role in assessing the overall quality of the testing effort and its impact on the final product.

SUMMARY

Before the present system(s) and method(s) are described, it is to be understood that this application is not limited to the particular system(s), and methodologies described, as there can be multiple possible embodiments that are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for creating an optimal test suite. This summary is not intended to identify essential features of the claimed subject matter, nor is it intended for use in determining or limiting the scope of the claimed subject matter.

In one implementation, a method for creating an optimal test suite is disclosed. The method comprises receiving code coverage data from a set of testing channels. The set of testing channels may comprise at least one of a unit testing channel, an automation testing channel, a manual testing channel, and a crowdsource testing channel. Further, the code coverage data received from the set of testing channels may be merged to create a combined dataset. The combined dataset may be analyzed to identify a line of code being executed by two or more test cases corresponding to two or more testing channels of the set of testing channels. Further, the method may comprise eliminating at least one test case from the two or more test cases having lesser efficiency to create an optimal test suite. The efficiency may be determined based on at least one of execution time, execution cost, and resources required to execute the line of code. In an embodiment, the optimal test suite may be executed to generate master code coverage. The master code coverage may comprise code coverage data from the set of testing channels. When at least the master code coverage is less than a defined threshold and critical code paths are unexecuted, the method may comprise generating a set of test cases to modify the optimal test suite using Artificially Intelligent (AI) model and Natural Language Processing (NLP) techniques. In one aspect, the aforementioned method to create an optimal test suite may be performed by a processor using programmed instructions stored in a memory.

In another implementation, a non-transitory computer readable medium embodying a program executable in a computing device for creating an optimal test suite is disclosed. The program may comprise a program code for receiving code coverage data from a set of testing channels. The set of testing channels may comprise at least one of a unit testing channel, an automation testing channel, a manual testing channel, and a crowdsource testing channel. Further, the program may comprise a program code for merging the code coverage data received from the set of testing channels to create a combined dataset. Subsequently, the program may comprise a program code for analyzing the combined dataset to identify a line of code being executed by two or more test cases corresponding to two or more testing channels of the set of testing channels. Further, the program may comprise a program code for eliminating at least one test case from the two or more test cases having lesser efficiency to create an optimal test suite. The efficiency may be determined based on at least one of execution time, execution cost, and resources required to execute the line of code. In an embodiment, the program may comprise a program code for executing the optimal test suite to generate master code coverage. The master code coverage may comprise code coverage data from the set of testing channels. When at least the master code coverage is less than a defined threshold and critical code paths are unexecuted, the program may comprise a program code for generating a set of test cases to modify the optimal test suite using Artificially Intelligent (AI) model and Natural Language Processing (NLP) techniques.

BRIEF DESCRIPTION OF THE DRAWINGS

The foregoing detailed description of embodiments is better understood when read in conjunction with the appended drawings. For the purpose of illustrating the present subject matter, an example of a construction of the present subject matter is provided as figures, however, the invention is not limited to the specific method and system for creating an optimal test suite disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

Figure 1:
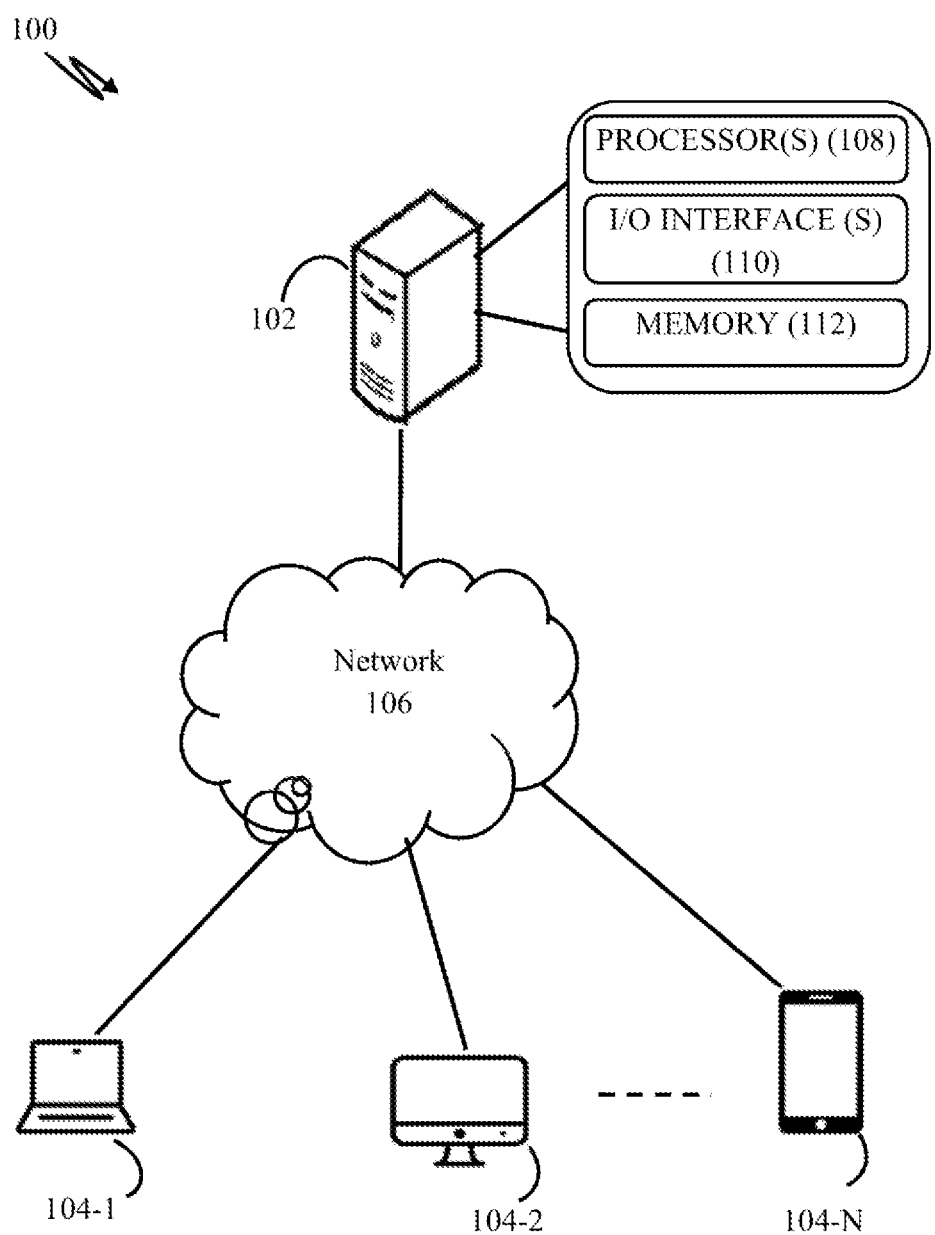
FIG. 1 illustrates a network implementation for creating an optimal test suite, in accordance with an embodiment of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "executing," "generating," "modifying," "creating," "merging," "analyzing," "eliminating," and other forms thereof, are intended to be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of the ordinary skill in the art will readily recognize that the present disclosure is not intended to be limited to the embodiments described but is to be accorded the widest scope consistent with the principles and features described herein.

The present subject matter discloses a method and a system for creating an optimal test suite. Initially, the system may receive a test suite and a software, or software build under testing. The test suite may comprise one or more test cases from a set of testing channels. In other words, the test suite may comprise one or more test cases related to an automation testing, a unit testing, a crowd-source testing, and a manual testing. In an embodiment, a separate test suite may be received for each testing channel, for example an automation test suite, a unit test suite, a crowd-source test suite, and a manual test suite.

Further, the software is executed based on the test suite using the set of testing channels. The system may collect test execution data and code coverage data. The test execution data may comprise at least test results, artifacts, pass status, fail status, screenshots, and logs. The code coverage data may comprise covered lines, uncovered lines, covered branches, uncovered branches, and coverage metrics. The code coverage data may be typically collected using techniques like code instrumentation or dynamic analysis. Further, the code coverage data may be used to determine the extent to which the code has been covered by the test suite.

Further to collecting test execution data, the system may merge the code coverage data received from the set of testing channels to create a combined dataset. Furthermore, the system may analyze the combined dataset to identify a line of code being executed by two or more test cases corresponding to two or more testing channels of the set of testing channels. In other words, the system may identify overlapping test cases or duplicate test cases by analyzing the combined dataset. Subsequently, the system may eliminate at least one test case from the two or more test cases having lesser efficiency to create an optimal test suite. The efficiency is determined based on at least one of execution time, execution cost, and resources required to execute the line of code.

Referring now to FIG. 1, a network implementation 100 of a system 102 for creating an optimal test suite is disclosed. Initially, the system 102 receives code coverage data from a set of testing channels. In an example, the software may be installed on a user device 104-1. It may be noted that the one or more users may access the system 102 through one or more user devices 104-2, 104-3 . . . 104-N, collectively referred to as user devices 104, hereinafter, or applications residing on the user devices 104. The system 102 may receive code coverage data from a set of testing channels. Further, the system may also 102 receive a feedback, from a user using the user device 104, related to modification of the optimal test suite.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be accessed by multiple users through one or more user devices 104-1, 104-3 . . . 104-N. In one implementation, the system 102 may comprise the cloud-based computing environment in which the user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

As there are various challenges observed in the existing art, the challenges necessitate the need to build the system 102 for creating an optimal test suite. At first, a user may use the user device 104 to access the system 102 via the I/O interface 110. The user may register the user devices 104 using the I/O) interface 110 in order to use the system 102. In one aspect, the user may access the I/O interface 110 of the system 102. The detail functioning of the system 102 is described below with the help of figures.

The present subject matter discloses the system 102 to create an optimal test suite. The system 102 may receive a test suite and a software or a software build. The test suite may comprise a set of test cases to test the software or the software build. The set of test cases may comprise one or more test cases related to unit, automation, manual and crowd-sourced testing. In other words, the test suite may comprise one or more test cases related to an automation testing, a unit testing, a crowd-source testing, and a manual testing. In an embodiment, a separate test suite may be received for each testing channel, for example an automation test suite, a unit test suite, a crowd-source test suite, and a manual test suite.

Further, the system may execute the software using the test suite to obtain test execution data and code coverage data from one or more testing channels. The test execution data comprises at least test results, artifacts, pass status, fail status, screenshots, and logs. The code coverage data may comprise covered lines, uncovered lines, covered branches, uncovered branches, and coverage metrics. The code coverage data may be typically collected using techniques like code instrumentation or dynamic analysis using code coverage tools. In an example and not by way of any limitation, java environment may utilize JaCoCo® as a code coverage tool and JavaScript-based applications and server-side NodeJS applications may use Istanbul® as a code coverage tool. Further, the code coverage data may be used to determine the extent to which the code has been covered by the test suite. In an embodiment, one or more code coverage tools or frameworks may record information related to executed lines or sections of the code and unexecuted lines or sections of the code. The information may be used to calculate code coverage metrics, such as line coverage, branch coverage, or statement coverage.

Further to obtaining the code coverage data, the system may merge the code coverage data received from the set of testing channels to create a combined dataset. Merging the code coverage data received from the set of testing channels may be referred to as a process of combining individual code coverage data obtained from the set of testing channels into a unified dataset. The merging process allows for a comprehensive code coverage analysis across multiple testing channels. The individual code coverage data obtained from a testing channel of the set of testing channels represents the extent to which the source code of a software application has been executed during testing for the testing channel.

The combined dataset may provide overall code coverage, considering the contributions of each testing channel from the set of testing channels. The merging process may involve aggregating the code coverage data at a granular level, such as at the line of code or function level, and combining the coverage information from different testing channels. The resulting combined dataset provides a consolidated view of the code coverage, allowing for analysis and evaluation of the thoroughness of testing efforts across multiple channels.

Further, the system may analyze the combined dataset to identify a line of code or a block of code being executed by two or more test cases corresponding to two or more testing channels of the set of testing channels. In an embodiment, the system may compare the coverage data for each line of code across the different test cases and different testing channels to determine the line of code or a code block that has been executed by two or more test cases from different testing channels.

Further, the system may eliminate at least one test case from the two or more test cases having lesser efficiency to create an optimal test suite. The efficiency may be determined based on at least one of execution time, execution cost, and resources required to execute the line of code. In an embodiment, the system may compare the test cases from different channels and remove duplicates or redundant test cases that provide the same coverage. It may be noted that the test cases contributing to unique code coverage are retained.

In an example, let us assume that the system receives code coverage data from a set of testing channels. The code coverage data is shown as below:

| Testing Channel | Code Coverage |
| --- | --- |
| Unit Testing | 40% |
| Automation Testing | 60% |
| Manual Testing | 20% |
| Integration Testing | 10% |
| Performance Testing | 15% |

Further, the system merges the code coverage data received from the set of testing channels to create a combined dataset. The code coverage data may comprise covered lines, uncovered lines, covered branches, uncovered branches, and coverage metrics. Furthermore, the system analyzes the combined dataset to identify a line of code being executed by two or more test cases corresponding to two or more testing channels of the set of testing channels.

| Lines of code being executed by two or more test cases | Testing Channels | Less Efficient Testing Channel(s) |
| --- | --- | --- |
| 50-70 | Automation and Manual | Manual |
| 120-160 | Automation, Manual and Unit | Manual and Unit |
| 200-250 | Automation and Performance | Performance |
| 300-350 | Unit and Integration | Integration |

Further, the system eliminates test cases having less efficiency to create an optimal test suite. The efficiency is determined based on at least one of execution time, execution cost, and resources required to execute the line of code. The system may employ a logic or algorithm to determine the efficiency of each test case based on the execution time, execution cost, and resources required to execute the line of code. For execution time, the system may measure the time taken to execute a test case and compare it with other test cases. Test cases that require less execution time are considered more efficient. Further, the execution cost refers to the resources and expenses associated with executing a test case. The execution cost may comprise parameters such as computing resources, human resources, infrastructure costs, and any additional expenses incurred during the execution process. Test cases having lower execution costs are considered more efficient. Furthermore, the resources required to execute a line of code may comprise memory usage, processing power, network bandwidth, or any other relevant resource. Test cases that utilize fewer resources while still effectively covering the code are considered more efficient.

Below table shows an example of an optimal test suite:

| Testing Channel | Test Cases Eliminated? | Included in Optimal Test Suite? |
| --- | --- | --- |
| Unit Testing | Yes | Yes |
| Automation Testing | No | Yes |
| Manual Testing | Yes | No |
| Integration Testing | Yes | Yes |
| Performance Testing | Yes | No |

In the above example, the system eliminates test cases from manual, unit, performance, and integration testing. The test cases are eliminated because a more efficient test case already exists. It may be noted that eliminating or deleting the test cases related to a test channel impacts the code coverage obtained by the testing channel. For example, code coverage obtained by manual testing was 20%, however test cases related to manual testing are not part of the optimal test suite. Similarly, code coverage obtained by unit testing was 40%, however the system deleted the less efficient test cases related to unit testing to optimize the test suite. Hence, the code coverage obtained by the unit testing may be less than 40%.

Further to creating an optimal suite, the system may execute the optimal test suite to generate master code coverage. The master code coverage comprises code coverage data from the set of testing channels. The master code coverage comprises statement coverage, branch coverage, function coverage, condition coverage, and coverage metrics.

Further to generating the master code coverage, the system may generate a set of test cases using Artificially Intelligent (AI) model and Natural Language Processing (NLP) Techniques to modify the optimal test suite when at least one of the master code coverage is less than a defined threshold, and critical code paths are unexecuted. The critical code paths may also be referred to as most frequently used lines of code. A critical code path refers to lines of code or code blocks within a software program that is essential for the correct functioning or performance of the software. The critical code paths represent parts of the code crucial for the software's intended functionality, reliability, security, or performance. The critical code paths may be determined by using a code profiling tool. In an alternate embodiment, the system may receive an input from a developer for the critical code paths.

It may be noted that the set of test cases may be generated using Artificially Intelligent (AI) model and Natural Language Processing (NLP) techniques. The AI model may comprise at least one of an Amazon Comprehend (AWS Comprehend), Google Cloud Natural API, an Information Retrieval model, a Semantic Textual Similarity model, and a Paraphrase Identification. In one embodiment, a combination of the above two models may be used for automatically generating the set of test cases to modify the optimal test suite. In another embodiment, the modification may be recommended using Machine Learning (ML) models. The Machine Learning models may comprise but are not limited to Support Vector Machine (SVM), Random Forest algorithm and alike.

The AI model may be trained using a training dataset comprising existing test cases along with their corresponding code coverage information. The training dataset comprises various test cases covering different code paths and scenarios. In an embodiment, each test case may be associated with its corresponding code coverage information. The code coverage information may include binary labels indicating whether each line or section of the code was covered. The AI model for test case generation may be one of a recurrent neural network (RNN), convolutional neural network (CNN), or transformer-based model. It may be noted that the AI model is continuously trained based on an input received by the user regarding the generated set of test cases.

Similarly, test cases for critical code paths may be generated using a machine learning model. The machine learning models may be trained based on a dataset of labeled examples, including information regarding the critical code paths and the corresponding test cases that cover the critical code paths.

Consider an example, the AI model generates a set of test cases to modify the optimal test suite when at least one of the master code coverage is less than a defined threshold, and critical code paths are unexecuted. The AI model undergoes initial training using a labeled dataset of code snippets, associated test cases, and corresponding code coverage. After the initial training, the model is deployed and used to generate a set of test cases. Once the set of test cases are generated, they are reviewed and executed by a tester or a developer. During the testing process, the tester may provide a feedback on the effectiveness, relevance, and coverage of the generated test cases. The tester may identify cases where the generated test cases miss certain critical scenarios or fail to cover specific aspects of the code path.

The system may receive a feedback from the testers to refine and improve the AI model. The feedback is incorporated into the training pipeline, allowing the model to learn from real-world testing experiences and adapt to the specific requirements of the software application. The refined model is then retrained using the updated dataset that includes the user feedback.

By continuously training the AI model based on user input and feedback, the system may improve the accuracy, relevance, and coverage of the generated test cases over time. This iterative training process ensures that the AI model becomes more proficient in generating high-quality test cases that address critical scenarios and meet the testing objectives of the software application.

In another example, the system may compare the master code coverage with a threshold. Let us assume that the master code coverage is 60 and the threshold code coverage is 80. Further, the system may generate a set of test cases to achieve the threshold code coverage of 80. The set of test cases are generated based on a set of Artificially Intelligent (AI) Models. Further, the set of test cases are generated for unexecuted section of the code. Furthermore, the set of test cases are generated for automation testing channel. In an embodiment, when the system identifies that a critical code path is unexecuted, the system may generate an alert to a developer. In another embodiment, the system may automatically generate the set of test cases for the critical code paths using the set of AI Models. In yet another embodiment, the system may modify existing test cases to cover large coverage.

In the above example, let us assume that the master code coverage is 70% and the defined threshold is 80%. To bridge this gap, the system leverages an AI model from the set of AI models to generate additional test cases specifically for automation testing. Let us assume that the system generates AI test case 1, AI test case 2, AI test case 3, AI test case 4, and AI test case 5. It may be noted that the AI test cases 1-5 are then added to the optimal test suite to modify the optimal test suite. Further, the modified optimal test suite may be executed to generate the master code coverage to meet the defined threshold or target threshold. By executing the AI generated test cases, the system executes more lines of code to increase the code coverage. With the inclusion of the AI-generated test cases, the automation testing coverage can be further improved, eventually helping the system meet or exceed the 80% master code coverage requirement.

In another example, let us assume that the master code coverage is 80% and the defined threshold is 75%. In the example, when the critical code paths are unexecuted, the system may generate a set of test cases for the critical code paths. In an embodiment, the set of test cases generated for the critical code paths may be referred to as impact test cases. In another embodiment, the system may automatically involve a human in the loop to verify the generated set of test cases. The human in the loop may provide feedback for the generated set of test cases. Further, the system continuously learns from the feedback provided by the system.

In an alternate embodiment, a predefined weight may be assigned to the set of testing channels based on effort (labor), execution time, and execution cost. The predefined weights help prioritize the significance and impact of each testing channel from the one or more testing channels on the overall code coverage analysis. The predefined weights assigned to each testing channel may vary depending on the specific context and requirements of a software development project.

Figure 2:
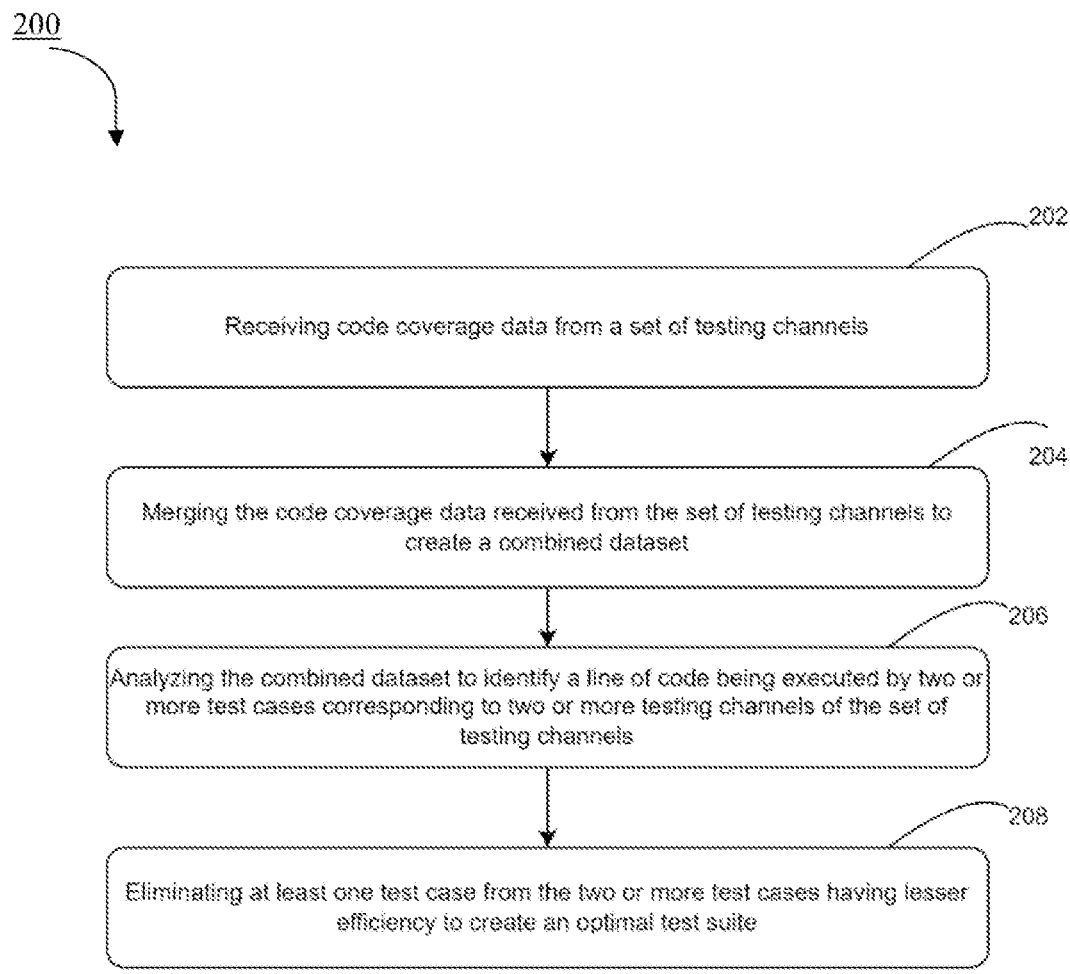
FIG. 2 illustrates a method for creating an optimal test suite, in accordance with an embodiment of the present subject matter.

Referring now to FIG. 2, a method 200 for creating an optimal test suite is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods for create an optimal test suite. Additionally, individual blocks may be deleted from the method 200 without departing from the scope of the subject matter described herein. Furthermore, the method 200 for creating an optimal test suite can be implemented in any suitable hardware, software, firmware, or combination thereof. However, for ease of explanation, in the embodiments described below, the method 200 may be considered to be implemented in the above-described system 102.

At block 202, code coverage data from a set of testing channels may be received. The set of testing channels may comprise at least one of a unit testing channel, an automation testing channel, a manual testing channel, and a crowd-source testing channel.

At block 204, the code coverage data received from the set of testing channels may be merged to create a combined dataset.

At block 206, the combined dataset may be analyzed to identify a line of code being executed by two or more test cases corresponding to two or more testing channels of the set of testing channels.

At block 208, at least one test case from the two or more test cases having lesser efficiency may be eliminated to create an optimal test suite. The efficiency may be determined based on at least one of execution time, execution cost, and resources required to execute the line of code.

Figure 3:
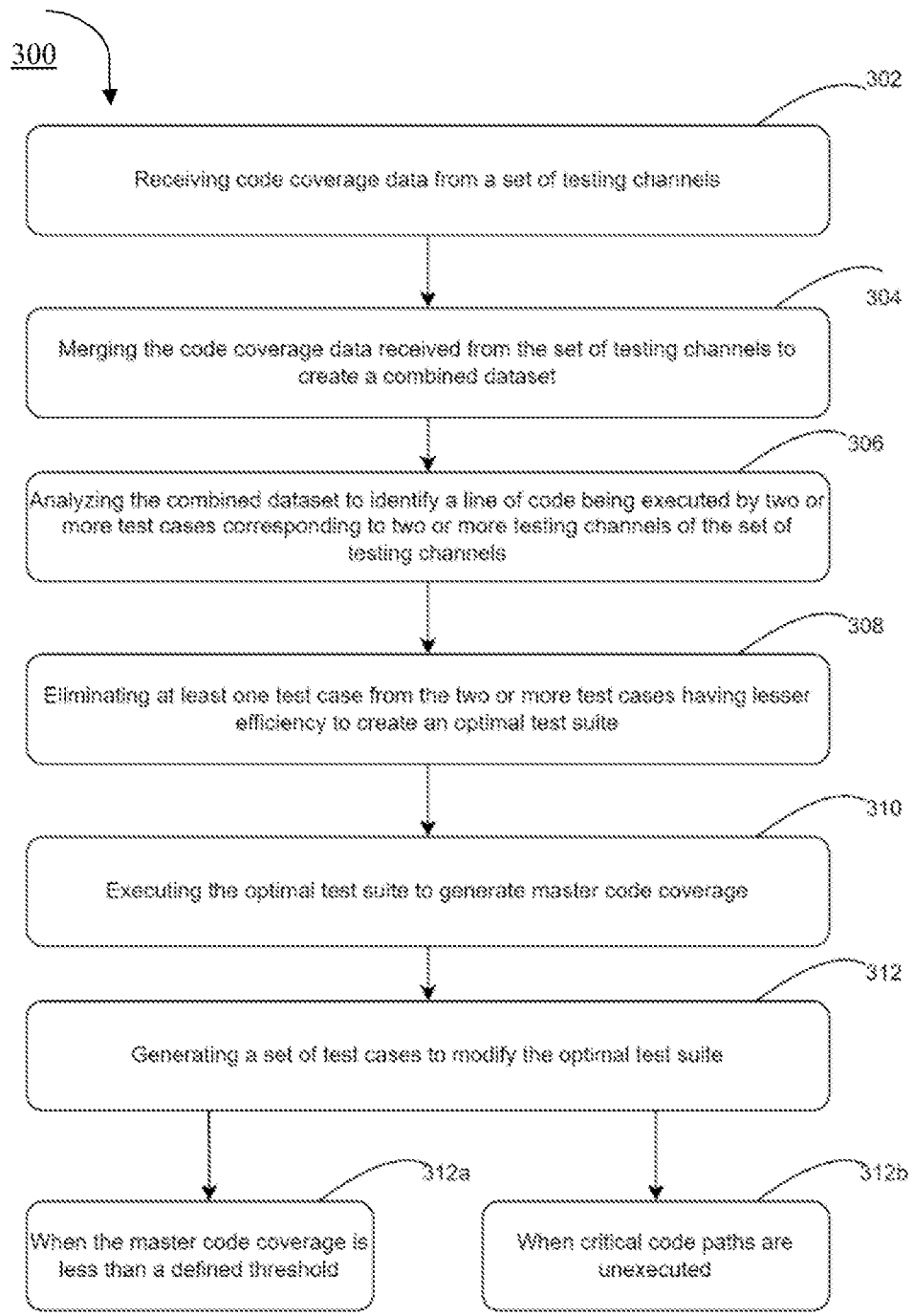
FIG. 3 illustrates a method to modify an optimal test suite, in accordance with an embodiment of the present subject matter.

Referring now to FIG. 3, a method 300 to modify an optimal test suite is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types.

The order in which the method 300 is described is not intended to be construed as a limitation, and any number of the described method blocks can be combined in any order to implement the method 300 or alternate methods for modifying the optimal test suite. Additionally, individual blocks may be deleted from the method 300 without departing from the scope of the subject matter described herein. Furthermore, the method 300 for modifying the optimal test suite can be implemented in any suitable hardware, software, firmware, or combination thereof. However, for ease of explanation, in the embodiments described below, the method 300 may be considered to be implemented in the above-described system 102.

At block 302, code coverage data from a set of testing channels may be received. The set of testing channels may comprise at least one of a unit testing channel, an automation testing channel, a manual testing channel, and a crowd-source testing channel.

At block 304, the code coverage data received from the set of testing channels may be merged to create a combined dataset.

At block 306, the combined dataset may be analyzed to identify a line of code being executed by two or more test cases corresponding to two or more testing channels of the set of testing channels.

At block 308, at least one test case from the two or more test cases having lesser efficiency may be eliminated to create an optimal test suite. The efficiency may be determined based on at least one of execution time, execution cost, and resources required to execute the line of code.

At block 310, the optimal test suite may be executed to generate master code coverage, wherein the master code coverage comprises code coverage data from the set of testing channels.

At block 312, a set of test cases may be generated using Artificially Intelligent (AI) model and Natural Language Processing (NLP) techniques to modify the optimal test suite when at least one of the master code coverage is less than a defined threshold, and critical code paths are unexecuted.

Exemplary embodiments discussed above may provide certain advantages. Though not required to practice aspects of the disclosure, these advantages may include those provided by the following features.

Some embodiments of the system and the method enable improved code coverage of a software by utilizing the set of testing channels. By leveraging the set of testing channels, including unit testing, automation testing, and manual testing, the system increases the overall test coverage and ensures a comprehensive evaluation of the software.

Some embodiments of the system and the method enable eliminating redundant or overlapping test cases. The system optimizes testing efforts and reduces the overall testing time and resource requirements. This leads to cost savings and improved efficiency in the testing process.

The system also facilitates effective test case selection by identifying the test cases that provide the best coverage for achieving a target threshold, such as a desired code coverage percentage. This ensures that the most relevant and impactful test cases are executed, improving the effectiveness of the testing process.

Some embodiments of the system and the method enable the automatic generation of additional test cases using AI techniques when the master code coverage falls below a predetermined threshold. This feature ensures that the software undergoes a more comprehensive testing process, even in cases where the existing test suite may not achieve the desired code coverage.

By leveraging AI algorithms and machine learning, the system analyzes the codebase and identifies areas with low or no coverage. Further, the system generates targeted test cases to address uncovered portions of the code. The automated test case generation helps bridge the gap between the existing test suite and the desired code coverage, enhancing the overall effectiveness of the testing process.

The automated test case generation based on AI not only improves code coverage but also enhances the scalability and adaptability of the testing process. As the software evolves and new features are added, the AI algorithms can continuously generate new test cases to keep up with the changes, ensuring that the testing remains comprehensive and up to date.

Some embodiments of the system and the method enable elimination of duplicate test cases covering the same code paths or scenarios. The duplicate test cases consume valuable testing resources without providing additional insights or benefits. The system intelligently analyzes the test suite and identifies such duplicates, ensuring that only unique and meaningful test cases are executed.

Although implementations for methods and system for create an optimal test suite have been described in language specific to structural features and/or methods, it is to be understood that the appended claims are not necessarily limited to the specific features or methods described. Rather, the specific features and methods are disclosed as examples of implementations for create an optimal test suite.

The invention claimed is:

1. A method to create an optimal test suite comprising:
receiving, by a processor, code coverage data from two or more testing channels, wherein the code coverage data is obtained by executing a software build with a test suite;
merging, by the processor, the code coverage data received from the two or more testing channels to create a combined dataset of the code coverage data, wherein the combined dataset includes:
a plurality of lines of code,
two or more testing channels used to execute two or more test cases on the plurality of lines of code, and
at least one testing channel determined to have lesser efficiency, wherein the efficiency is determined based on at least one of an execution time, an execution cost, and resources utilized to execute the line of code;
analyzing, by the processor, the combined dataset to identify a line of code being executed by the two or more test cases corresponding to the two or more testing channels;
eliminating, by the processor, at least one test case from the two or more test cases having lesser efficiency to create the optimal test suite;
executing, by the processor, the optimal test suite to generate master code coverage comprising code coverage data from the two or more testing channels; and
generating, by the processor, a set of test cases to modify the optimal test suite when at least one of:
the master code coverage is less than a defined threshold, and
critical code paths are unexecuted;
wherein the set of test cases is generated using an Artificially Intelligent (AI) model and Natural Language Processing (NLP) techniques, wherein the AI model is trained using a training dataset comprising test cases along with their corresponding code coverage information, and wherein the AI model is continuously trained based on feedback received regarding the generated set of test cases.

2. The method of claim 1, wherein the two or more testing channels comprises at least two of a unit testing channel, an automation testing channel, a manual testing channel, and a crowdsource testing channel.

3. The method of claim 1, wherein the critical code paths are determined by using a code profiling tool.

4. The method of claim 1, further comprising determining, by the processor, a testing channel having highest code coverage value from the two or more testing channels, wherein the testing channel is determined based on at least one of execution time, execution cost, and resources versus code coverage value.

5. The method of claim 1, wherein the set of test cases is generated for an unexecuted section of the code, and wherein the set of test cases is generated for an automation testing channel.

6. The method of claim 1, wherein the code coverage information includes binary labels indicating whether each line or section of the code was covered.

7. The method of claim 1, wherein the AI model is at least one of an Amazon Comprehend (AWS Comprehend), Google Cloud Natural API, an Information Retrieval model, a Semantic Textual Similarity model, and a Paraphrase Identification.

8. A system for creating an optimal test suite, the system comprising:
a memory; and
a processor coupled to the memory, wherein the processor is configured to execute program instructions stored in the memory to:
receive code coverage data from two or more testing channels, wherein the code coverage data is obtained by executing a software build with a test suite;
merge the code coverage data received from the two or more testing channels to create a combined dataset, wherein the combined dataset includes:
a plurality of lines of code,
two or more testing channels used to execute two or more test cases on the plurality of lines of code, and
at least one testing channel determined to have lesser efficiency, wherein the efficiency is determined based on at least one of an execution time, an execution cost, and resources utilized to execute the line of code;
analyze the combined dataset to identify a line of code being executed by two or more test cases corresponding to the two or more testing channels;
eliminate at least one test case from the two or more test cases having lesser efficiency to create the optimal test suite;
executing the optimal test suite to generate master code coverage comprising code coverage data from the two or more testing channels; and
generating, by the processor, a set of test cases to modify the optimal test suite when at least one of:
the master code coverage is less than a defined threshold, and
critical code paths are unexecuted;
wherein the set of test cases is generated using an Artificially Intelligent (AI) model and Natural Language Processing (NLP) techniques, wherein the AI model is trained using a training dataset comprising test cases along with their corresponding code coverage information, and wherein the AI model is continuously trained based on feedback received regarding the generated set of test cases.

9. The system of claim 8, wherein the two or more testing channels comprises at least two of a unit testing channel, an automation testing channel, a manual testing channel, and a crowdsource testing channel.

10. The system of claim 8, wherein the critical code paths are determined by using a code profiling tool.

11. The system of claim 8, wherein the processor is further configured to: determine a testing channel having highest code coverage value from the two or more testing channels, wherein the testing channel is determined based on at least one of execution time, execution cost, and resources versus code coverage value.

12. The system of claim 8, wherein the set of test cases is generated for an unexecuted section of the code, and wherein the set of test cases is generated for an automation testing channel.

13. The system of claim 8, wherein the code coverage information includes binary labels indicating whether each line or section of the code was covered.

14. The system of claim 8, wherein the AI model is at least one of an Amazon Comprehend (AWS Comprehend), Google Cloud Natural API, an Information Retrieval model, a Semantic Textual Similarity model, and a Paraphrase Identification.

15. A non-transitory computer program product having embodied thereon a computer program to create an optimal test suite, the non-transitory computer program product storing instructions for:
receiving code coverage data from two or more testing channels, wherein the code coverage data is obtained by executing a software build with a test suite;
merging the code coverage data received from the two or more testing channels to create a combined dataset of the code coverage data, wherein the combined dataset includes:
a plurality of lines of code,
two or more testing channels used to execute two or more test cases on the plurality of lines of code, and
at least one testing channel determined to have lesser efficiency, wherein the efficiency is determined based on at least one of an execution time, an execution cost, and resources utilized to execute the line of code;
analyzing the combined dataset to identify a line of code being executed by the two or more test cases corresponding to two or more testing channels;
eliminating at least one test case from the two or more test cases having lesser efficiency to create an optimal test suite;
executing the optimal test suite to generate master code coverage comprising code coverage data from the two or more testing channels; and
generating a set of test cases to modify the optimal test suite when at least one of:
the master code coverage is less than a defined threshold, and
critical code paths are unexecuted;
wherein the set of test cases is generated using an Artificially Intelligent (AI) model and Natural Language Processing (NLP) techniques, wherein the AI model is trained using a training dataset comprising test cases along with their corresponding code coverage information, and wherein the AI model is continuously trained based on feedback received regarding the generated set of test cases.

* * * * *